United States Patent
Lietsalmi et al.

(10) Patent No.: US 6,522,877 B1
(45) Date of Patent: Feb. 18, 2003

(54) METHODS AND APPARATUS FOR PROVIDING AN INTERACTIVE CELL BROADCAST SERVICE

(75) Inventors: Mikko Lietsalmi, Oulu (FI); Jaakko Vanttila, Oulu (FI); Seppo Alanara, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 974 days.

(21) Appl. No.: 08/708,179

(22) Filed: Sep. 6, 1996

(51) Int. Cl.[7] .............................. H04Q 7/20; H04Q 7/38
(52) U.S. Cl. ...................... 455/422; 455/466; 455/458; 455/517; 370/496; 370/522; 340/7.2; 340/7.21; 340/7.22
(58) Field of Search ............................... 455/466, 403, 455/31.2, 31.3, 422, 515, 517, 426, 458, 558, 412; 370/496, 522, 347; 340/7.2, 7.21, 7.22, 7.23

(56) References Cited

U.S. PATENT DOCUMENTS

| | | | | |
|---|---|---|---|---|
| 4,231,114 A | * | 10/1980 | Dolikian ..................... | 455/515 |
| 4,875,038 A | * | 10/1989 | Siwiak et al. .............. | 455/31.2 |
| 5,179,721 A | * | 1/1993 | Comroe et al. ............. | 455/422 |
| 5,276,729 A | | 1/1994 | Higuchi et al. ............... | 379/58 |
| 5,404,355 A | | 4/1995 | Raith ......................... | 370/95.1 |
| 5,465,389 A | | 11/1995 | Agrawal et al. ........... | 455/33.2 |
| 5,473,667 A | * | 12/1995 | Neustein .................... | 455/31.2 |
| 5,603,081 A | * | 2/1997 | Raith et al. ................. | 455/422 |
| 5,604,744 A | * | 2/1997 | Andersson et al. ......... | 370/347 |
| 5,604,921 A | * | 2/1997 | Alanara ....................... | 455/466 |
| 5,655,215 A | * | 8/1997 | Diachina et al. ........... | 455/31.3 |
| 5,794,142 A | * | 8/1998 | Vanttila et al. ............. | 455/466 |

OTHER PUBLICATIONS

"S–BCCH for IS–136", TR45.3.6/95.06.13/8, Digital Cellular Systems, Jun. 12–15, 1995 (Ericsson).
Over–the–Air Activation Teleservice (OATS), Dec. 15, 1995, pp. 329–368.
"Proposed new SMS services", SMS,JEM/94,03.21, Mar. 22, 1994, Seppo Alanara.
"Proposed Feature/Service Code List", TR45.3.6/94.04.06.16, Digital Cellular Systems, Mark Wells, Seppo Alanara, Apr. 5–7, 1994.
IS–136.1 Rev 0, May 17, 1995, Section 7, pp. 286–307.
"TDMA Forum, Implementation Guide: Short Message Terminal Complain With IS–136 and Is–137" (Ed. D. Holmes, vers. 7.0, Apr. 20, 1995.

* cited by examiner

Primary Examiner—William Trost
Assistant Examiner—Keith Ferguson
(74) Attorney, Agent, or Firm—Harrington & Smith, LLP

(57) ABSTRACT

A method is disclosed for operating a cellular communications system of a type that comprises a Base Station/Mobile Switching Center/Internetworking function (BMI) and a plurality of mobile stations. The method includes the steps of transmitting a point-to-multipoint message (e.g., a Broadcast SMS message) from the BMI to the plurality of mobile stations; and, in at least some of the plurality of mobile stations, receiving the point-to-multipoint message and transmitting an acknowledgement to the BMI using a point-to-point message. The point-to-multipoint message includes an information element having a value for specifying one of (a) that a mobile station receiving the message is prohibited from responding to the message, (b) that a mobile station receiving the message must respond to the message, and (c) that a mobile station receiving the message may optionally respond to the message. Mobile stations receiving the message selectively respond or not respond to the message, at least as a function of the value of the information element.

7 Claims, 4 Drawing Sheets

FIG. 2
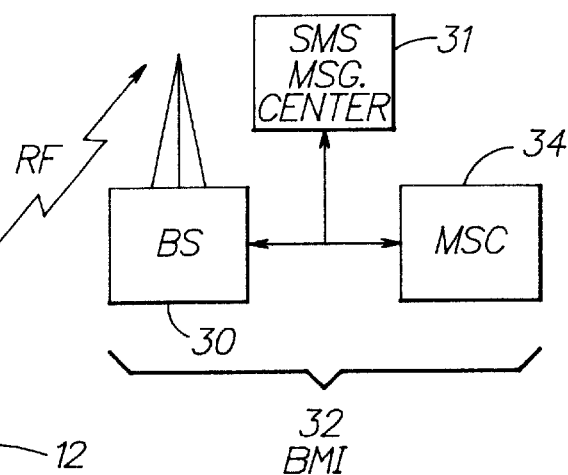
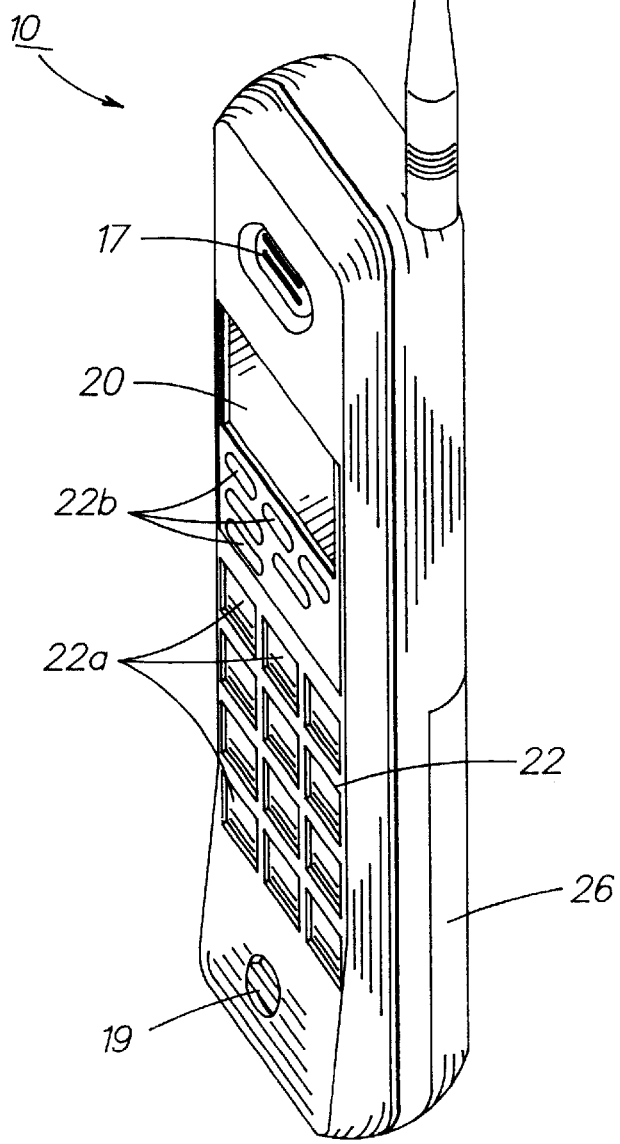

METHODS AND APPARATUS FOR PROVIDING AN INTERACTIVE CELL BROADCAST SERVICE

FIELD OF THE INVENTION

This invention relates generally to radiotelephones and, in particular, to radiotelephones or mobile stations capable of operation with a digital cellular network.

BACKGROUND OF THE INVENTION

The so-called Short Message Service (SMS) is a point-to-point service which enables a user to send messages to and receive text messages from other users of a communications network. The SMS attempts to deliver a message to a mobile terminal whenever the terminal is registered to the network, even when the terminal is engaged in a voice or data call. The terminal may also roam throughout the network and still be capable of sending and receiving messages. A terminal configured for SMS provides methods for the user to receive, read, write/edit, clear, send, and save messages. The connection of a standard keyboard to the terminal facilitates the generation and editing of text messages by the user.

The network stores messages in at least one Message Center (MC), and Mobile Terminated (MT) messages are sent to the terminal by an MC. Various SMS protocol layers receive the messages and check their contents. If the contents are valid, and assuming that there is room for incoming text messages in the memory of the terminal, the message is received and stored. Otherwise, the message is rejected.

U.S. Pat. No. 4,644,351 (Zabarsky et al.) discloses a paging system that enables messages to be sent to a remote unit, and which has a capability for the remote unit to transmit a message-received acknowledgement signal back to a central site. The paging system of Zabarsky et al. also enables a message-presented verification to be transmitted from an addressed pager back to the central site.

Reference can be had to the TIA Interim Standards IS-136 and IS-137, and also to a document entitled "TDMA Forum, Implementation Guide: Short Message Terminals Compliant With IS-136 and IS-137" (Ed. D. Holmes, vers. 7.0, Apr. 20, 1995). These documents specify one type of SMS and the various system and terminal level protocols required to provide SMS. This latter document describes in sections 3.2.1 and 3.2.2 a Delivery Acknowledgement and a Manual Acknowledgement capability, respectively. By example, a message "Can you meet me this evening? <NTC>Yes<NTC>No", where NTC is a non-text character, is said would allow the user to select a response from "Yes" or "No", and consequently cause the terminal to send response codes 0 or 1.

Another type of SMS is known as broadcast SMS (or also as S-BCCH), which is a point-to-multipoint operation (i.e., from a network operator to a plurality of mobile stations). Reference may had to, by example, a publication entitled "S-BCCH for IS-136", TR45.3.6/95.06.13/8, Digital Cellular Systems, Jun. 12–15, 1995 (Ericsson).

The Short Message Service Broadcast Channel (S-BCCH), in the IS-136 specification, is specified for use in sending short point-to-multipoint messages to mobile stations, such as radiotelephones. A maximum number of 15 slots per superframe may be assigned to the S-BCCH logical channel. The S-BCCH is considered as a continuous channel even if more than one slot is allocated to the S-BCCH. The IS-136 rev. 0 specification does not specify particulars of this mode of operation, except for the layer 2 reservation of slots within a superframe.

One possible implementation for such a system is as follows. This implementation is similar to that originally set forth in the preliminary IS-136 rev. 0 specification.

The SMS frame can be defined as a sequence of 24 Superframes which are aligned with a Hyperframe (HF) counter. Thus, the number of slots assigned to the SMS frame are 0, 24, 48, 72, depending on how many slots per superframe are assigned to BCCH.

The Hyperframe (HF) counter and a Primary Superframe (SF) indicator can be provided in the BCCH. These two counters together (2*HF Counter+Primary SF indicator) constitute a Superframe counter. A SMS frame is defined to be a single complete cycle (0–23) of the SF counter. The SMS frame is aligned to start at a HF counter value of 0, and also when the Primary Superframe indicator equals 0. The SF counter provides SMS frame synchronization information to the mobile station.

SMS subchannels are defined to allow different repetition cycles for different messages. Each subchannel has its own repetition cycle defined in terms of units of SMS frames. SMS frames are grouped into the SMS subchannels. Within each subchannel, a repetition cycle is defined (in units of SMS frames) with which the SMS broadcast message sequences contained in the SMS sub-channel are repeated. The SMS broadcast subchannel cycle may range from 1 to 64 SMS frames in length. Within each subchannel, the first S-BCCH slot within each SMS frame contains a header that describes the structure of the subchannel. Up to four subchannels may be defined. If more than one subchannel exists, the subchannels are time-multiplexed onto the S-BCCH channel on a SMS frame basis. If a SMS subchannel block is defined to consist of one SMS frame from each subchannel, placed in ascending order of subchannel number, then the multiplexed subchannels can be defined as the repetition of these subchannel blocks. The number of subchannels and the identity of the subchannel to which an SMS frame belongs are specified in the SMS frame header.

According to SMS header information found in the first slot in any SMS frame, the set of messages in SMS(i) may span M(i) number of SMS frames before a cycle is completed. M(i) is the length of the sub-channel cycle. The SMS frame number within the subchannel cycle is referred to as the phase of the subchannel cycle.

A number of different BCCH message categories can be defined. These include Emergency Information messages, Time and Date messages, Overload Class messages, System Identity messages, and Broadcast messages. Each BCCH message typically includes a number of fields of information. These fields can include: a Protocol Discriminator field (2 bits), a Message Type field (6 bits), a SMS Message ID field (8 bits), and a Text Message Data field (8 to 2024 bits).

The Broadcast Message category field is coded to provide a number of different types of message category identifiers. These include, by example, emergency numbers and roadside information, toll gate information, airline departure/arrival information, weather-related information, news, and financial information.

What is not currently provided, and what is thus an object of this invention, is a signalling capability that selectively enables a mobile station that receives a broadcast SMS message to reply to the message.

OBJECTS OF THE INVENTION

It is thus a first object of this invention to provide an improved method for providing broadcast SMS in a digital cellular system, wherein a point-to-multipoint message can be responded to in a point-to-point manner.

It is a second object of this invention to provide an improved method for providing broadcast SMS in a digital cellular system, wherein a point-to-multipoint message can be responded to by a mobile station originating a call to a call-back number that comprises a part of the broadcast SMS message.

It is a further object of this invention to provide an improved method for providing broadcast SMS in a digital cellular system, wherein a point-to-multipoint message can be responded to by a mobile station generating a manual acknowledgement message.

SUMMARY OF THE INVENTION

The foregoing and other problems are overcome and the objects of the invention are realized by methods and apparatus in accordance with embodiments of this invention.

A method of this invention is disclosed for operating a cellular communications system of a type that comprises a Base Station/Mobile Switching Center/Interworking function (BMI) and a plurality of mobile stations. The method includes the steps of transmitting a point-to-multipoint message (e.g., a Broadcast SMS message) from the BMI to the plurality of mobile stations; and, in at least some of the plurality of mobile stations, receiving the point-to-multipoint message and transmitting an acknowledgement to the BMI using a point-to-point message.

The point-to-multipoint message includes an information element having a value for specifying one of (a) that a mobile station receiving the message is prohibited from responding to the message, (b) that a mobile station receiving the message must respond to the message, and (c) that a mobile station receiving the message may optionally respond to the message. Mobile stations receiving the message selectively respond or not respond to the message, at least as a function of the value of the information element.

The method further includes an initial step of transmitting a message to the plurality of mobile stations, the message including an information element for specifying that the BMI is capable of transmitting a point-to-multipoint message.

In one embodiment of this invention the step of responding includes a step of generating and transmitting a manual acknowledgement message, while in another embodiment the step of responding includes a step of originating a call to a telephone number that forms a portion of the point-to-multipoint message.

In a preferred embodiment of this invention the steps of transmitting and responding each use an R-Data message or equivalent, as especified in IS-136 or similar air interface standards.

The use of this invention enables a network operator to poll a plurality of mobile stations, at a cell level or higher (e.g., a SID level), so as to elicit a response to an issue presented in the point-to-multipoint message. In this manner the user's of the mobile stations may vote on an issue presented for consideration.

The use of this invention furthermore enables a network operator, or some other entity, to offer goods or services through the point-to-multipoint message, and to respond to acknowledgement messages transmitted from mobile stations having user's that wish to avail themselves of the offered goods or services.

BRIEF DESCRIPTION OF THE DRAWINGS

The above set forth and other features of the invention are made more apparent in the ensuing Detailed Description of the Invention when read in conjunction with the attached Drawings, wherein:

FIG. 2 is an elevational view of the mobile station shown in FIG. 1, and which further illustrates a cellular communication system to which the mobile station is bidirectionally coupled through wireless RF links;

DETAILED DESCRIPTION OF THE INVENTION

Figure 1:
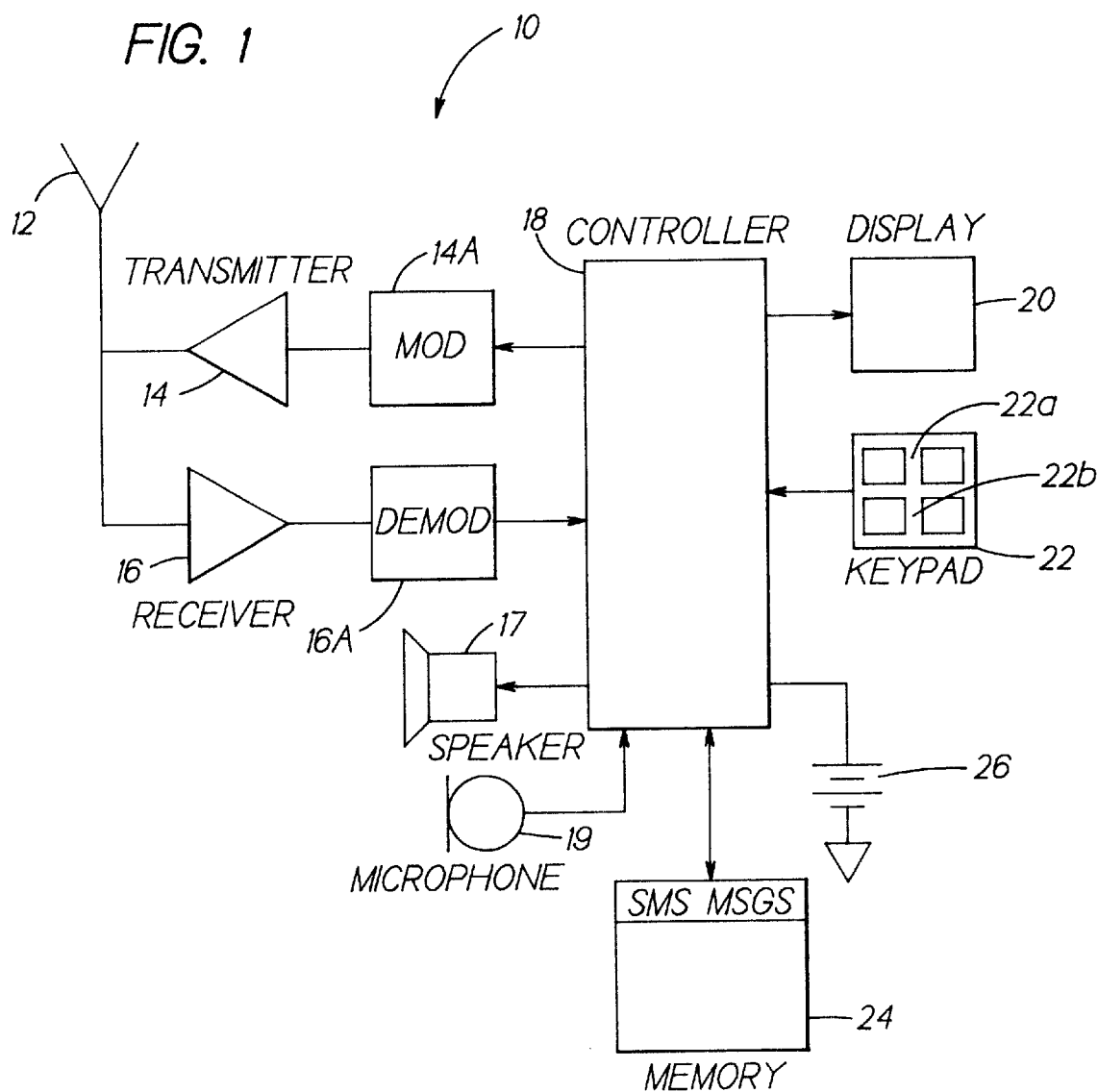
FIG. 1 is a block diagram of a mobile station that is constructed and operated in accordance with this invention.
Figure 3:
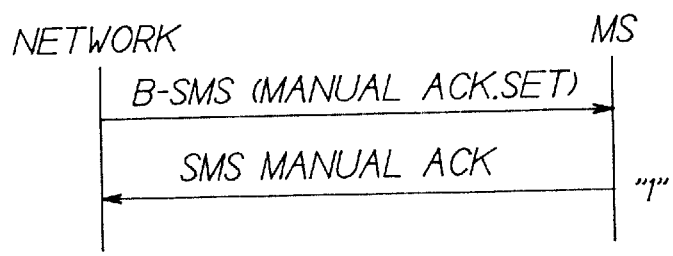
FIGS. 3–6 illustrate various network-mobile station (MS) S-BCCH and acknowledgement signalling exchanges in accordance with the teachings of this invention.

Reference is made to FIGS. 1 and 2 for illustrating a wireless user terminal or mobile station 10, such as but not limited to a cellular radiotelephone or a personal communicator, that is suitable for practicing this invention. The mobile station 10 includes an antenna 12 for transmitting signals to and for receiving signals from a base site or base station 30. The base station 30 is a part of a cellular network comprising a Base Station/Mobile Switching Center/Internetworking function (BMI) 32 that includes a mobile switching center (MSC) 34. The MSC 34 provides a connection to landline trunks when the mobile station 10 is involved in a call. The BMI 32 is also considered to include or be coupled to a SMS message center 31.

The mobile station includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include a physical and logical frame structure of a type that was described above, although the teaching of this invention is not intended to be limited only to this specific structure, or for use only with an IS-136 compatible mobile station, or for use only in TDMA type systems.

It is understood that the controller 18 also includes the circuitry required for implementing the audio and logic functions of the mobile station. By example, the controller 18 may be comprised of a digital signal processor device, a microprocessor device, and various analog to digital converters, digital to analog converters, and other support circuits. The control and signal processing functions of the mobile station are allocated between these devices according to their respective capabilities.

A user interface includes a conventional earphone or speaker 17, a conventional microphone 19, a display 20, and a user input device, typically a keypad 22, all of which are coupled to the controller 18. The keypad 22 includes the conventional numeric (0–9) and related keys (#,*) 22a, and other keys 22b used for operating the mobile station 10. These other keys 22b may include, by example, a SEND key, various menu scrolling and soft keys, and a PWR key. The mobile station 10 also includes a battery 26 for powering the various circuits that are required to operate the mobile station.

The mobile station 10 also includes various memories, shown collectively as the memory 24, wherein are stored a plurality of constants and variables that are used by the controller 18 during the operation of the mobile station. For example, the memory 24 stores the values of various cellular system parameters and the number assignment module (NAM). An operating program for controlling the operation of controller 18 is also stored in the memory 24 (typically in a ROM device). The memory 24 may also store data, including point-to-point and Broadcast SMS messages, that are received from the BMI 32 prior to the display of the messages to the user.

It should be understood that the mobile station 10 can be a vehicle mounted or a handheld device. It should further be appreciated that the mobile station 10 can be capable of operating with one or more air interface standards, modulation types, and access types. By example, the mobile station may be capable of operating with any of a number of other standards besides IS-136, such as GSM and IS-95 (CDMA). Some narrow-band AMPS (NAMPS), as well as TACS, mobile stations may also benefit from the teaching of this invention, as should dual or higher mode phones (e.g., digital/analog (IS-41) or TDMA/CDMA/analog phones). It should thus be clear that the teaching of this invention is not to be construed to be limited to any one particular type of mobile station or air interface standard.

The operating program in the memory 24 includes routines to present messages and message-related functions to the user on the display 20, typically as various menu items. The memory 24 also includes routines for implementing the methods described below in relation to FIGS. 3–7.

In a first aspect, a presently preferred embodiment of this invention modifies a list of point-to-point teleservices that is transmitted from the network operator to the mobile station 10. The point-to-point teleservices build upon the R-DATA message (see Sections 2.7.3.1.3.2.19 and 3.7.3.1.3.2.23 of IS-136.2, and Sections 6.4.3.11 and 6.4.4.9 of IS-136.1). Each teleservice is identified by a unique value of the higher layer protocol identifier field within the R-DATA unit information element that is included within the R-DATA message. In addition to, by example, the point-to-point SMS and over the air activation teleservices, the list of teleservices is modified to include a Broadcast SMS category (e.g., value= 0000 0100). The receipt of this value in the teleservices list informs the mobile station 10 that the BMI 32 is capable of supporting Broadcast SMS.

In a second aspect, the presently preferred embodiment of this invention provides a Broadcast SMS Deliver message that is transmitted from the BMI 32 to the mobile station 10. The Broadcast SMS Deliver message is used in support of mobile station terminated Broadcast SMS delivery. The Broadcast SMS Deliver message includes the following information elements:

Message Type Indicator
Message Reference
Total # of Messages
Message #
User Data Unit
Message Provider
Call Back Number
Call Back Number Presentation Indicator
Call Back Number Alpha Tag.

In accordance with this invention the Broadcast SMS Deliver Message further includes an information element defined as a Manual Acknowledgement Request. The Manual Acknowledgement Request information element is used in the Broadcast SMS Deliver message to indicate that a manual acknowledgement of the Broadcast SMS message, using a point-to-point SMS Manual ACK message (see, for example, Section 7.1.2.4 for the point-to-point SMS case), is either prohibited (e.g., value=00), requested (e.g., value= 01), or optional (e.g., value=10).

Figure 7:
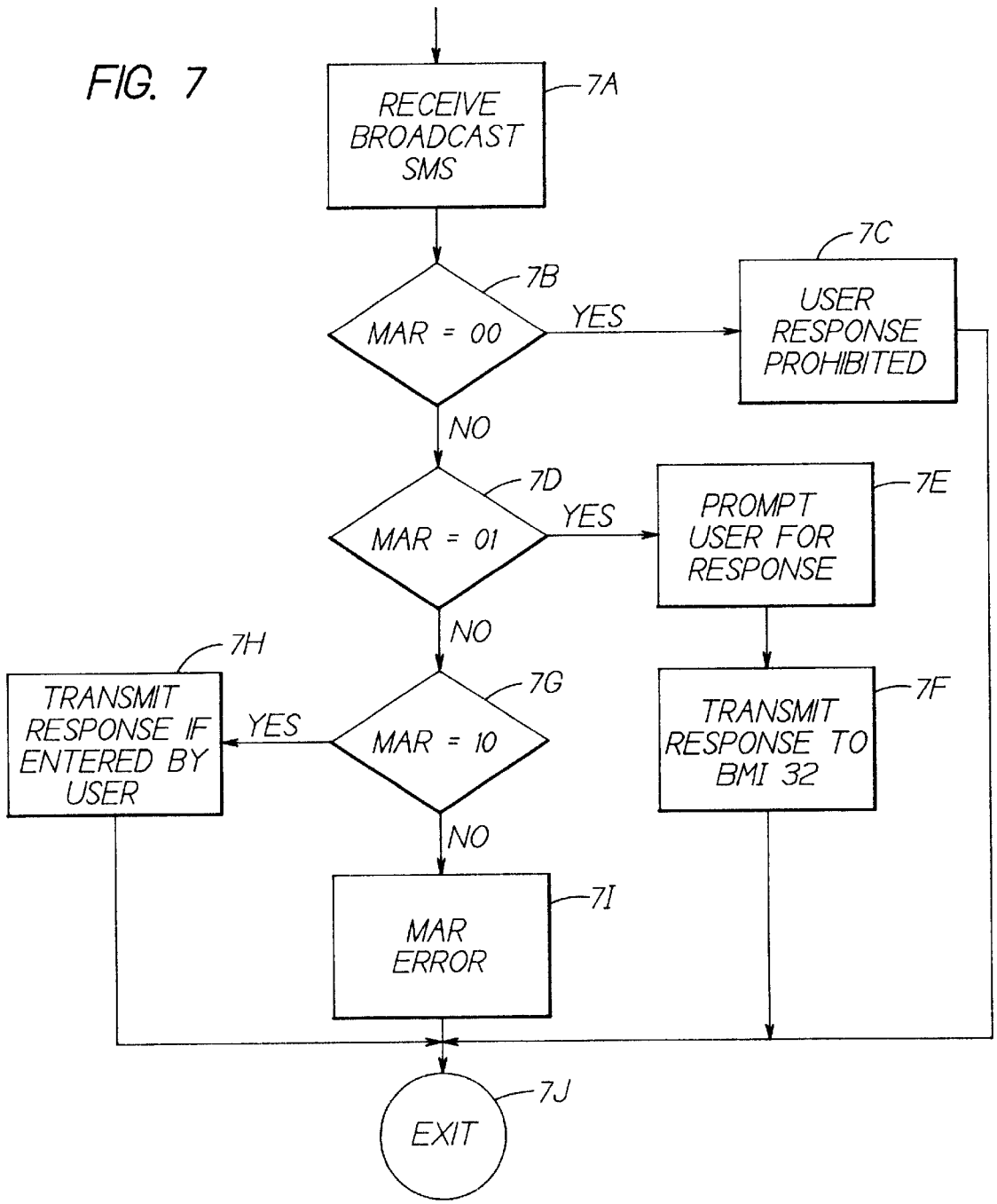
FIG. 7 is a logic flow diagram that illustrates a method of this invention.

Referring now to FIG. 7, in response to receiving the Broadcast SMS Deliver message (Block 7A), the mobile station 10 stores the message in the memory 24. Subsequently, the mobile station 10 displays the message to user on the display 20, either immediately or when requested by the user, and examines the value of the Manual Acknowledgement Request (MAR) information element. If the value is equal to 00 (Block 7B), the mobile station 10 inhibits the generation of a user response or acknowledgement to the Broadcast SMS message (Block 7C). If the value is equal to 01 (Block 7D), the mobile station 10 prompts the user to generate a point-to-point SMS Manual Acknowledgement message (Block 7E). Reference in this regard can be made to, by example, IS-136.1, Rev. A., Sections 7.1.1.2.3, and 7.1.2.4.

In general, an SMS MANUAL ACK message is defined to be sent from a mobile station as a result of the user responding to a previously received SMS DELIVER message. The mobile station 10 sets the Message Reference in the SMS MANUAL ACK to the Message Reference in the SMS DELIVER message that is being user acknowledged. In addition, the mobile station 10 sets the User Destination Address and User Destination Subaddress in the R-DATA message (see, for example, Section 6.4.3.11) in which the SMS MANUAL ACK is sent to the User Originating Address (if included) and User Originating Subaddress (if included) in the R-DATA message in which the SMS DELIVER message being acknowledged was received.

Reference may also be had to, by example, commonly assigned U.S. patent application Ser. No. 08/562,900, filed Nov. 27, 1995, entitled "Mobile Terminal Having One Key User Message Acknowledgment Function" by J. Sappänen, J. Vaihoja, M. Lietsalmi, and J. Vänttilä.

In response to the user entering a manual acknowledgement of the displayed Broadcast SMS message, the mobile station 10 formats and transmits (Block 7F) a suitably formatted SMS Manual Acknowledgement message to the BMI 32, thereby enabling the user to respond to a received point-to-multipoint Broadcast SMS message with a point-to-point acknowledgement.

If the value is equal to 10 (Block 7G), the mobile station 10 considers the user acknowledgement to be optional. In this case the mobile station 10 will accept and transmit a user manual acknowledgement, if entered by the user while the Broadcast SMS message is displayed (Block 7H). However, the entry of the manual acknowledgement is not required by the user.

If the value of the Manual Acknowledgement Request information element is other than 00, 01, or 10, the information element is considered to be erroneous (Block 7I).

At the Exit point (Block 7J), the mobile station 10 can check the memory 24 to determine if there are any further stored Broadcast (or point-to-point) SMS messages, and display a next message if available (and if desired by the user).

In view of the foregoing it can be appreciated that this invention teaches an Interactive Cell Broadcast Service. In one aspect of this invention the service provider transmits cell broadcast messages which contain numbered choices. In these messages the manual acknowledgement is employed, which enables users to respond by sending manual acknowledgements back to the service provider, via the BMI 32. That is, this invention allows cellular service providers to offer an interactive cell broadcast type of services to their subscribers. An example of such a service is cell broadcast based voting, in which a service provider transmits a cell broadcast message which enables subscribers within a certain geographic area to "vote". Cellular users are thus enabled to read the broadcast message, make a choice, and then vote their preference by using the manual acknowledgement feature of the cell broadcast service.

By example, the service provider can transmit a Broadcast SMS message, via the BMI 32, to a plurality of mobile stations 10 within all or a portion of the coverage area of the BMI 32. The message may state, by example, "Would you prefer to be billed on the 1st of the month, or on the 15th of the month? Press '0' to vote for the 1st, and '1' to vote for the 15th". In response to receiving this Broadcast SMS Deliver message, each mobile station 10 examines the value of the Manual Acknowledgement Request information element when displaying the message to user. If it is equal to 01, the user is required to respond (i.e., to vote his choice), otherwise if it is equal to 10, the user may optionally respond. For the case where the user does respond by depressing either the 0 key or the 1 key on the keypad 22, a properly formatted point-to-point Manual Acknowledgement message is transmitted to the BMI 32, which records the responses received from the mobile stations 10.

The avoidance of "double voting" can be accomplished in several ways. For example, the mobile station 10 can recognize that it has received a cell broadcast SMS message with manual acknowledgment set, and display the message to the user only if the manual acknowledgement for this message has not been transmitted. Once the Manual Acknowledgement is transmitted, the mobile station 10 can simply erase the stored Broadcast SMS message, thereby preventing its re-display. It is also within the scope of this invention for the BMI 32 to prevent intentional or unintentional multiple voting by subscribers. For example, once the Manual Acknowledgement message is received from a particular user (as identified by, for example, the User Originating Address and Subaddress information elements of the R-Data message), the network automatically rejects any further manual acknowledgements from that user (see FIG. 3).

It should be noted that the identity of a responding user can be screened to a certain degree through the use of the User Originating Address Presentation Indicator information element of the R-Data message (see Section 6.4.3.11), which is defined to be included to identify presentation restriction and screening related to the User Originating Address information element. By providing a menu function enabling the user to selectively set this information element as desired, the identity of the responding mobile station 10 can be either made available or not made available.

Figure 4:
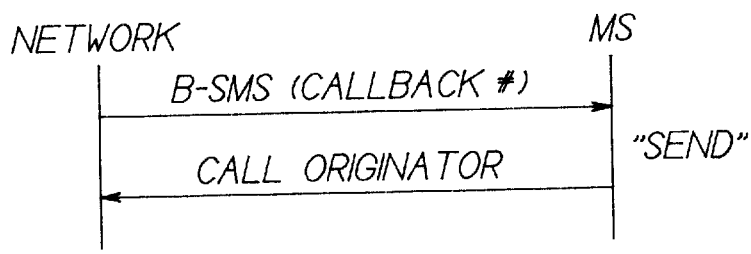

Another example of the use of this invention is a case where a service provider broadcasts a message into a certain geographic area, where the broadcast SMS message describes the services and also provides a callback number which cellular users can use to callback and order services. In this case the user may simply dial a displayed callback number or, as shown in FIG. 4, the callback number can be automatically dialled by the mobile station 10 in response to an input from the user (e.g., by the user depressing the 'Send' key). Various businesses that serve the geographical area can also use this feature, by offering the sale of goods or services, and by providing a callback number within the Broadcast SMS message.

Figure 5:
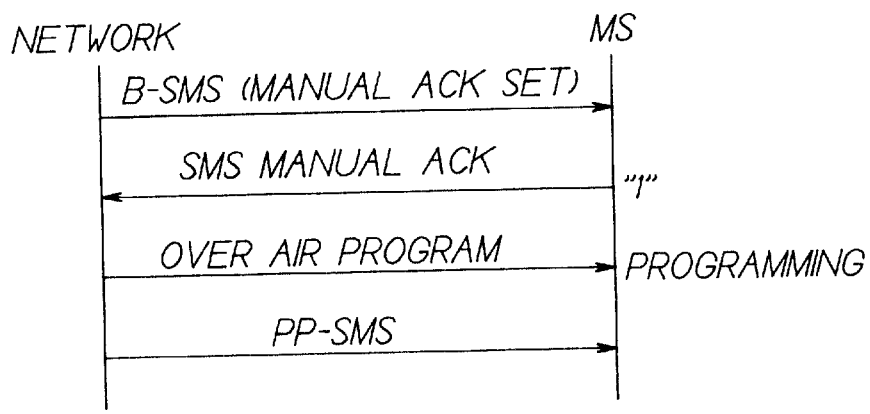
Figure 6:
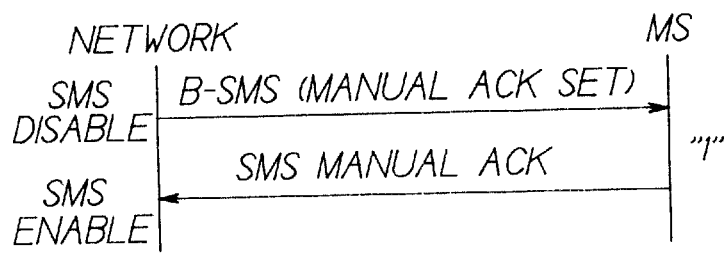

Still another example is the use of Cell Broadcast service to provide cellular users an ability to subscribe to different cellular services, such as participation in certain user groups, etc. For example, and referring to FIGS. 5 and 6, a cellular service provider transmits a cell Broadcast SMS message which contains a description of one or more services (for example, SMS, call forwarding, etc.). In the message the user is thereby provided with different cellular service possibilities. The user can subscribe to one or more such services by sending an appropriate manual acknowledgement defined in the cell broadcast message. After the cellular service provider receives the manual acknowledgement message from an individual user, it can proceed accordingly to provide the requested service or services. In FIG. 5 the mobile station (MS) 10 has depressed the "1" key to select an offered service. The network responds by performing over the air programming of the requesting mobile station, thereby enabling the mobile station to use the requested service. This can be followed, if required, by a point-to-point SMS message to the mobile station 10 to inform the user that the requested service is now active. FIG. 6 presents the case where the network provider offers SMS service to all mobile stations with a Broadcast SMS message (e.g., "Would you like to subscribe to SMS message service for a one week trial basis? Press '0' for No or '1' for Yes."). In response to those users who depress the 1 key on the keypad 22, the network enables SMS message service for only the requesting users. For this type of message the MAR can be set to either 01 (mandatory) or 10 (optional) reply. For the latter case, those mobile stations 10 that do not reply within a predetermined period of time can be defaulted to the 0 or No category of response.

Although described in the context of preferred embodiments, it should be realized that a number of modifications to these teachings may occur to one skilled in the art. By example, certain steps shown in the logic flow diagram of FIG. 7 could be executed in other than the order shown, while still obtaining the same result. Also, and as was indicated previously, the teachings of this invention are not intended to be limited to only one air interface standard or protocol, such as IS-136.

Thus, while the invention has been particularly shown and described with respect to preferred embodiments thereof, it will be understood by those skilled in the art that changes in form and details may be made therein without departing from the scope and spirit of the invention.

What is claimed is:

1. A method for operating a wireless communications system of a type that comprises a Base Station/Mobile Switching Center/Interworking function (BMI), comprising the steps of:

transmitting a point-to-multipoint message from the BMI to a plurality of mobile stations, the point-to-multipoint message including an information element having a value for specifying one of (a) that a mobile station receiving the message is prohibited from responding to the message, (b) that a mobile station receiving the message must respond to the message, and (c) that a mobile station receiving the message may optionally respond to the message; and in a mobile station, receiving the point-to-multipoint message and selectively responding or not responding to the message, at least as a function of the value of the information element.

2. A method as set forth in claim 1, and further comprising an initial step of transmitting a message to the plurality of mobile stations, the message including an information element for specifying that the BMI is capable of transmitting a point-to-multipoint message.

3. A method as set forth in claim 1, wherein the step of responding includes a step of generating and transmitting a manual acknowledgement message.

4. A method as set forth in claim 1, wherein the step of responding includes a step of originating a call to a telephone number that forms a portion of the point-to-multipoint message.

5. A method as set forth in claim 1, wherein the steps of transmitting and responding each use and R-Data message.

6. A mobile station for use in a wireless communications system of a type that comprises a Base Station/Mobile Switching Center/Interworking function (BMI), said mobile station comprising:

- a receiver for receiving a Broadcast Short Message Service (SMS) message that is transmitted by the BMI;
- a memory for storing the received Broadcast SMS message;
- a user interface for presenting the stored Broadcast SMS message to the user and for entering a response from the user; and
- a transmitter for transmitting a Manual Acknowledgment message to the BMI, the Manual Acknowledgment message indicating the user's response to the presented Broadcast SMS message;
- where the Broadcast SMS message includes an information element having a value for specifying one of (a) that a mobile station receiving the message is prohibited from responding to the message, (b) that a mobile station receiving the message must respond to the message, and (c) that a mobile station receiving the message may optionally respond to the message; and where the mobile station is responsive to the information element for selectively requiring or not requiring that the user enter a response.

7. A mobile station as set forth in claim 6, wherein the Broadcast SMS message contains a description of a service offer that is made available to a plurality of mobile stations;

the Manual Acknowledgment message indicates a user's response to the offer; and the transmission of the Manual Acknowledgment message is specified by the BMI to be one of mandatory or optional.

\* \* \* \* \*